United States Patent [19]

Jones et al.

[11] 4,279,936
[45] Jul. 21, 1981

[54] MALTOL TREATED CANNED MEAT PROCESS

[75] Inventors: Dorothy L. Jones, Arlington; Frank R. Conant, Lexington, both of Mass.

[73] Assignee: William Underwood Company, Westwood, Mass.

[21] Appl. No.: 78,240

[22] Filed: Sep. 24, 1979

[51] Int. Cl.³ .................. A23B 4/02; A23L 1/272; A23L 1/31; A23L 3/310
[52] U.S. Cl. .................................. 426/265; 426/281; 426/332; 426/652
[58] Field of Search ............... 426/265, 518, 442, 332, 426/574, 646, 652, 647, 281, 264

[56] References Cited

U.S. PATENT DOCUMENTS

| 3,477,859 | 11/1969 | Brown et al. | 426/265 |
| 3,867,558 | 2/1975 | Sato et al. | 426/265 |

Primary Examiner—Joseph M. Golian
Assistant Examiner—Elizabeth J. Curtin
Attorney, Agent, or Firm—Schiller & Pandiscio

[57] ABSTRACT

A method is provided for preserving the pink meat color in canned, cooked "red" meat, in the absence of nitrates or nitrites, by adding to the meat selected quantity of gamma pyrones at one or more of the various stages of the curing, cooking and canning processes, and in some instances, also in connection with the addition of iron salts.

9 Claims, No Drawings

MALTOL TREATED CANNED MEAT PROCESS

This invention relates to a system for preserving pink meat color in canned, cooked, cured meats, and is intended to replace those processes which employ alkali nitrites and nitrates in the production of sterilized, canned red meat products.

In meat canning, the product is typically processed by grinding, cutting, chopping or the like and thorough mixing of the comminuted meat with seasoning ingredients. The mixed meat, which may be partially cooked, is then placed into a sealed container (referred to hereinafter as a can) and heated to complete cooking and sterilization. The heating results in coagulation and denaturation of the meat protein. During the cooking and canning process, in the absence of nitrites and/or nitrates, frequently a color change will occur, typified by the formation of a surface discoloration of a greenish nature which gives the meat the appearance of being spoiled, even though it is commercially sterile.

For many years, alkali nitrite has been used in the production of sterilized canned beef, pork, poultry and fish. The nitrite along with salt and mild heat treatment produces with respect to red meats, a product with a stable pink color, and a typical cured flavor. Additionally, in non-sterilized products, nitrites inhibit the growth of clostridium botulinum bacteria and the production of their toxins during storage. However, recently, it has been recognized that nitrites may react with secondary and tertiary amines to form nitrosamines which are strongly carcinogenic. It is generally accepted that the stable color produced by using nitrites and nitrates is caused by chemical reactions between the nitrates and nitrites and the tissue and blood pigments of red meat, i.e. myoglobin and hemoglobin. Nitrate and nitrite ions by several intrinsic chemical oxidation and reduction reactions in the meat become nitric oxide which reacts with myoglobin to form nitric oxide myoglobin. The latter on heating is transformed to nitric oxide myochromogen, a stable pink pigment which provides a pleasing color to meat. The products of this process have gained widespread acceptance among consumers.

Because the public has shown an acceptance of the pink color of canned, cured meat, it is desirable to preserve this color attribute of the product without the use of nitrates and nitrites which may form carcinogens. Particularly, nitrates and/or nitrites used in canned, heat sterilized meats are obviously not necessary as antibacterials, but serve primarily as color preservatives. A large number of other additives have been suggested for preserving red or pink color in cured cooked meats, typically asorbic acid or its salts, various dyes, alkali metal aluminates, and the like.

It is also known that the addition to raw ground red meats of certain gamma pyrones inhibits the change in color which normally takes place in the storage of raw ground red meats. For example, in Sato et al, U.S. Pat. Nos. 3,867,981 and 3,867,558, both to Sato et al, there is disclosed the use of several pyrones to preserve the red color of raw meat. The process specifically requires the incorporation of the gamma pyrone compound into the ground meat by thorough mixing and refrigeration storage of 24 hours or more. Sato et al stress that the process involves the treatment of fresh, raw, uncured, red meat only and that no cooking takes place during the conduct of the process, noting that cooking brings on a different transformation of color than that to which they refer in connection with their process. Also, curing of the meat is specifically not involved in the Sato et al process and the process explicitly does not include the treatment of meats which have been cured.

The principal object of the present invention is therefore to provide a method for preserving the pink meat color in canned, cooked "red" meat, in the absence of nitrates or nitrites. To effect this object, the present invention generally employs a selected quantity of gamma pyrones at one or more of the various stages of the process, and in some instances, also in connection with the addition of iron salts.

Gamma pyrones are commercially available under the common name Maltol (3-hydroxy-2-methyl-$\gamma$-pyrone) from Pfizer Chemical Company and others. It is postulated that maltol mixed with comminuted red meat complexes the iron atom of the myoglobin and prevents the degradation of myoglobin to an iron-free porphyrin-globin complex which tends to break down to a greenish porphyrin moiety. The presence of maltol will insure that such degradation does not occur.

The gamma pyrones, herein referred to generically as Maltols, useful in the present invention include 3-hydroxy-2-methyl-$\gamma$-pyrone; 3 hydroxy-2-ethyl-$\gamma$-pyrone; 5 hydroxy-2-methyl-$\gamma$-pyrone and 5 hydroxy-2-ethyl-$\gamma$-pyrone. The iron salts optionally used with maltol in the present invention are preferably initially ferrous salts of organic acids such as gluconates, citrates and the like, selected such that when ionized the organic acid will not materially shift the pH of the meat mixture.

The pickle brine used in the process of the present invention is important primarily as a matter of taste and texture to the consumer but also is desirably compatible with maltol in terms of taste and chemistry as well. To this end, the pickle preferably is a nitrate-nitrite free pickling solution formed of common salt (NaCl) and a sweetener (e.g. cane sugar, dextrose, fructose, corn syrup and the like) in water in concentrations selected largely at the manufacturer's choice.

The improved process of the present invention, particularly useful with fresh or frozen pork comprises the addition of maltol in sufficient quantity so that in the finished product, the gamma pyrone is present in its free form in a range of about 0.02–0.2 percent by weight. The inclusion of maltol can be done at one of several stages, depending upon the procedure used to cure and cook the pork. One can add maltol to a pickling solution free of nitrates and nitrites, such solution typically being composed of common salt and a sweetener. For example, a ham is artery or stitch pumped with the pumping pickle and then allowed to cure in a maltol-free cover pickling bath. The ham can then be pre-cooked to green weight, processed to coarse ground form, hot water cooked, reground with spices, blended and canned. Additional maltol and iron salts can be added just prior to canning.

Instead of injecting the pumping pickle into the fresh or frozen ham, the latter can be processed through coarse grinding, mixed with the pumping pickle and allowed to cure prior to precooking.

The particular amount of maltol added in the process, either to the pickling solution or directly to the ground meat depends upon the presence of various steps of the process, such as hot water cooking, which may leach some of the maltol from the meat mixture prior to canning. As noted, it is desirable that the free maltol content in the final product should be in the range of 0.02–0.2 percent by weight. A smaller amount of maltol will often not provide the desired coloration and a larger amount of maltol does not improve the color and may impart an undesirable taste, it being known that maltol is a powerful flavor enhancer. In the cases where iron salts are added during the process, the latter should be limited to not greater than 0.04% by weight of the final product. The valence state of the iron is not generally important in that it is expected to be converted to the ferrous state inasmuch as the meat is a reducing matrix. Excessive amounts of the ferrous ion should not be used because the complex wth maltol tends to become brown at high iron levels.

The procedure employed to assay for free maltol in the finished meat product follows the recommendations of Pfizer Chemical Company, manufacturers of maltol. One gram of finely divided meat product is mixed into 20 ml of water, placed in a separatory funnel and 0.5 ml of 5 N sulfuric acid added. The solution is then extracted with three 20 ml portions of chloroform. All three chloroform portions are combined and extracted with three portions each of 10 ml 1 N sodium hydroxide solutions. The latter are then combined and a reagent of 4 ml of 5 N sulfuric acid and 1 ml ferric chloride (2% in 2N hydrochloric acid) is added. After dilution to 50 ml, the final solution is examined for optical absorbance at 530 nm and the micrograms of maltol in the sample are then calculated from the absorbance.

The following examples are illustrative of the process of the present invention.

EXAMPLE I

A fresh or frozen ham is processed to remove the skin and bones, and the fat is separated from the lean meat. Both the lean and fat are ground ($\frac{1}{2}$" holes), the ground lean meat then being mixed with a pumping pickle in weight proportion five parts lean meat to one part pickle. The brine pickle is typically composed by weight of about 3% sweetener such as sugar, 20% common salts, 0.7% maltol, and the balance is water.

The ground meat is thoroughly mixed with the pickle and maintained at 40° F. for three days, then being precooked in boiling water to green weight. The precooked pickled lean is mixed with the ground fat and with any desired spice mix in weight proportion about 1 to 2% spice, balance mixed meat. The mixture of fat into the precooked lean meat thus avoids rendering the fat. This latter mixture is ground, mixed and reground ($\frac{1}{8}$" holes) and then heated to about 160° F. for 40 minutes to deactivate any enzymes present.

If desired, at this stage of the process one optimally may add a dry mixture of maltol 0.1% and ferrous gluconate 0.04% (by weight of the meat mixture) before filling cans with the mixture. The maltol-ferrous salt addition, if made, should preferably not bring the total free maltol concentration above 0.2% by weight of the final meat product.

Analysis of the meat mixture placed in the cans, where the total maltol is derived from the pickle, indicates that the free maltol is present in a range of 0.03 to 0.05 weight % of the meat mixture, some of the original maltol having been leached in the boiling water precook stage.

Finally, the cans are filled with the processed meat, sealed and heat sterilized, for example for 211×101.5 cans, at about 240° F. for 40 minutes and then water-cooled prior to storage. When the stored can is later opened, the meat is found to have a desirable pink color which has not faded with aging, and without evidence of any greenish surface color which would occur if the meat had been processed in the same manner but with the maltol omitted.

EXAMPLE II

A pumping pickle is prepared containing about 20% common salt, 3 to 4% sugar and 0.28% maltol, balance water. A fresh or frozen ham is then artery or stitch pumped with the pickle to about 10% of the ham weight. The pumped ham is then immersed in a cover pickle containing salt and sugar, and allowed to cure for several days at 40° F. The cured ham is then steam precooked to green weight and the skin and bone of the precooked ham is removed. The ham meat, both fat and lean, is mixed with a spice mixture (1 to 2% spice, balance meat) and ground ($\frac{1}{8}$" holes). The ground meat and spice mixture is then mixed and heated. At this stage, one can add a mixture of maltol around 0.1% by weight, and ferrous gluconate around 0.04% by weight to the meat being mixed, and the latter is then filled into cans, sealed and processed as in Example I. The canned product should contain free maltol in the proportion exemplified in Example I and will also exhibit the same desirable pink color which is not lost with aging.

EXAMPLE III

This example follows the steps of Example II up to the removal of skin and bones, but instead of grinding both the fat and lean together, they are separated and coarse ground separately. The coarse ground lean meat is then hot water cooked, and following hot water cooking the coarse ground fat is added to the hot-water-cooked lean meat. While this step serves to minimize rendering of the fat, the hot-water-cooking step does leach out some of the maltol, so that it may be desirable to add maltol with or without the ferrous salt just prior to canning to thereby bring the final maltol concentration to the desired level. The other steps and the result of the process are substantially the same as thus described in connection with Example II.

Since certain changes may be made in the above processes without departing from the scope of the invention herein involved, it is intended that all matter contained in the above description shall be interpreted in an illustrative and not in a limiting sense.

What is claimed is:

1. In a process for preparing canned, cured, red meats wherein the pink color of the canned meat is preserved without using nitrates or nitrites, which process comprises curing the meat with a pickling brine, packing the meat in cans and heat cooking and sterilizing the canned meat, the improvement comprising the step of mixing with said meat prior to sterilization, an amount of maltol sufficient to provide a proportion of free maltol by weight in the range of 0.02 to 0.2% in the canned meat.

2. The process defined in claim 1 wherein said maltol is selected from the group consisting of
   3-hydroxy-2-methyl-γ-pyrone
   3-hydroxy-2-ethyl-γ-pyrone
   5-hydroxy-2-methyl-γ-pyrone, and
   5-hydroxy-2-ethyl-γ-pyrone.

3. The process defined in claim 1 wherein maltol is added to the pickling brine.

4. The process defined in claim 3 wherein maltol is added to said brine in a range of from about 0.2% to 1.0% by weight of said brine.

5. The process defined in claim 3 where said brine is pumped into said meat.

6. The process defined in claim 5 including the step of comminuting said meat after said meat has been cured by said brine.

7. The process defined in claim 3 including the steps of comminuting said meat, and immersing the comminuted meat thereafter in said brine to effect said curing.

8. The process defined in claim 3 wherein immediately prior to the step of packing the meat in cans, additional maltol is added to said meat.

9. The process defined in claim 8 including the addition of a soluble iron salt with said additional maltol in proportion of about 0.1% maltol to 0.04% iron salt by weight of the packed meat.

* * * * *